United States Patent
Chu

(10) Patent No.: US 7,574,232 B2
(45) Date of Patent: Aug. 11, 2009

(54) MOBILE COMMUNICATION TERMINAL AND SIGNAL RECEIVING METHOD THEREOF

(75) Inventor: Sung Ho Chu, Seoul (KR)

(73) Assignee: LG Electronics Inc., Seoul (KR)

( * ) Notice: Subject to any disclaimer, the term of this patent is extended or adjusted under 35 U.S.C. 154(b) by 469 days.

(21) Appl. No.: 11/283,756

(22) Filed: Nov. 22, 2005

(65) Prior Publication Data

US 2006/0121870 A1   Jun. 8, 2006

(30) Foreign Application Priority Data

Nov. 23, 2004   (KR)   .......................... 2004-0096334

(51) Int. Cl.
*H04M 1/00*   (2006.01)
*H04B 17/02*   (2006.01)

(52) U.S. Cl. ................................. 455/552.1; 455/277.1

(58) Field of Classification Search .................. 455/73, 455/78–83, 132–135, 137, 272, 277.1, 277.2, 455/552.1, 553.1

See application file for complete search history.

(56) References Cited

U.S. PATENT DOCUMENTS

| 6,172,970 | B1 | 1/2001 | Ling et al. |
| 2002/0003494 | A1 | 1/2002 | Huisken |
| 2003/0022647 | A1 | 1/2003 | Li et al. |
| 2003/0193923 | A1 | 10/2003 | Abdelgany et al. |
| 2003/0236096 | A1 | 12/2003 | Yamazaki |
| 2007/0243832 | A1 * | 10/2007 | Park et al. ..................... 455/73 |

FOREIGN PATENT DOCUMENTS

| CN | 1287441 | 3/2001 |
| JP | 2003-032140 | 1/2003 |
| JP | 2004-235746 | 8/2003 |
| RU | 2160975 C2 | 12/2000 |
| WO | WO 2003/010982 A2 | 2/2003 |
| WO | WO 03/088510 A1 | 10/2003 |
| WO | WO 2004/086657 A2 | 10/2004 |

* cited by examiner

*Primary Examiner*—Lee Nguyen
(74) *Attorney, Agent, or Firm*—McKenna Long & Aldridge LLP

(57) ABSTRACT

A mobile communication terminal and signal receiving method thereof are disclosed, by which GPS and DMB signals can be received using a dual band antenna. The present invention includes a CDMA-mobile broadcast dual band antenna receiving a CDMA or mobile broadcast signal, a mobile broadcast-GPS dual band antenna receiving a mobile broadcast of GPS signal, a first means for diverging the CDMA or mobile broadcast signal received by the CDMA-mobile broadcast dual band antenna, a second means for diverging the mobile broadcast or GPS signal received by the mobile broadcast-GPS dual band antenna, and a third means for selecting either the mobile broadcast signal outputted from the first means or the mobile broadcast signal outputted from the second means if the selected mobile broadcast signal has a signal quality better than that of the non-selected mobile broadcast signal.

14 Claims, 2 Drawing Sheets

MOBILE COMMUNICATION TERMINAL AND SIGNAL RECEIVING METHOD THEREOF

This application claims the benefit of the Korean Patent Application No. 10-2004-0096334, filed on Nov. 23, 2004, which is hereby incorporated by reference as if fully set forth herein.

BACKGROUND OF THE INVENTION

1. Field of the Invention

The present invention relates to a mobile communication terminal, and more particularly, to a mobile communication terminal and signal receiving method thereof. Although the present invention is suitable for a wide scope of applications, it is particularly suitable for receiving GPS and mobile broadcast signals by preventing interference between radio signals received via a dual band antenna.

2. Discussion of the Related Art

Generally, as standards for mobile broadcasting, there are FLO (forward link only) by Qualcomm, U.S.A., DVB-H (digital video broadcasting-handheld) by Nokia, Europe, and Korean DMB (digital multimedia broadcasting) based on European digital audio broadcasting (DAB). DMB is selected to be explained in the following description. As used herein, the term DMB does not limit the scope of the claims to the Korean standard. Rather, the term DMB is used as a generic indicator of a variety of multimedia services that include both audio data and video data, such as, but not limited to, those services represented by the standards identified above.

DMB describes a broadcasting service that enables appreciation of high quality video and CD-level music at anytime or anywhere. DMB is merging with a current mobile communication technology such that DMB service will be available via a mobile communication terminal.

FIG. 1 is a block diagram of a mobile communication terminal to receive CDMA and DMB signals according to a related art.

Referring to FIG. 1, a mobile communication terminal according to a related art consists of a CDMA-DMB dual band antenna 11 and a DMB antenna 12 to provide CDMA communications and DMB services.

Signals received via the CDMA-DMB dual antenna 11 are selectively switched by a diplexer 13 according to mode selection control signals, respectively. Hence, a CDMA signal is inputted to a radio frequency receiver (RFR) chipset 17 via a CDMA RF path 14, whereas a DMB signal is inputted to a DMB chipset 18 via a first DMB RF path 15. Meanwhile, a DMB signal received via the DMB antenna 12 is inputted into the DMB chipset 18 via a second DMB RF path 16. The DMB chipset 18 selects, based on the path having the better radio sensitivity, which of the two DMB signals is to be used.

Meanwhile, in order for the mobile communication terminal to use a function of GPS (global positioning system) as well as to receive the DMB, the CDMA-DMB dual band antenna 11 is replaced by a CDMA-DMB-GPS triple band antenna to perform triple switching using an SP3T (single pole three-throw) switch and the like or a GPS antenna is independently provided to use.

However, in using the triple band antenna, a primary interference signal between a 1.57 GHz GPS signal and an 824~896 MHs CDMA signal lies on 2.39~2.47 GHz to affect a 2.6 GHz DMB satellite signal. And, a primary interference signal between the CDMA and DMB satellite signals lies on 1.78~1.70 GHz to affect the 1.57 GHz GPS signal.

Moreover, in case of using the GPS antenna independently, the three antennas coexisting in one mobile communication terminal mutually play a role as dipole intervening with each other in radio sensitivity to degrade the radio sensitivity or reception.

SUMMARY OF THE INVENTION

Accordingly, the present invention is directed to a mobile communication terminal and signal receiving method thereof that substantially obviates one or more problems due to limitations and disadvantages of the related art.

An object of the present invention is to provide a mobile communication terminal and signal receiving method thereof, by which GPS and DMB signals can be received using a dual band antenna.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile communication terminal according to the present invention includes a first reception path establishing unit to receive a CDMA or mobile broadcast signal, a second reception path establishing unit to receive a DMB or GPS (global positioning system) signal, a mobile broadcast chipset receiving the mobile broadcast signal delivered via the first or second reception path establishing unit, and a radio frequency reception (RFR) chipset receiving the CDMA and/or GPS signal delivered via the first or second reception path establishing unit.

Preferably, the first reception path establishing unit includes a CDMA-mobile broadcast dual band antenna receiving the CDMA or mobile broadcast signal and a first diplexer selecting the CDMA or mobile broadcast signal received via the CDMA-mobile broadcast dual band antenna according to the mode selection control signal. And, the second reception path establishing unit includes a mobile broadcast-GPS dual band antenna receiving the mobile broadcast or GPS signal and a second diplexer selecting the mobile broadcast or GPS signal received via the mobile broadcast-GPS dual band antenna according to the mode selection control signal.

More preferably, the mobile communication terminal further includes a band-pass filter (BPF) passing the GPS signal selected by the second diplexer.

In another aspect of the present invention, a mobile communication terminal includes a CDMA-mobile broadcast dual band antenna receiving a CDMA or mobile broadcast signal, a mobile broadcast-GPS dual band antenna receiving a mobile broadcast of GPS signal, a first means for diverging the CDMA or mobile broadcast signal received by the CDMA-mobile broadcast dual band antenna, a second means for diverging the mobile broadcast or GPS signal received by the mobile broadcast-GPS dual band antenna, and a third means for selecting either the mobile broadcast signal outputted from the first means or the mobile broadcast signal outputted from the second means if the selected mobile broadcast signal has a signal quality better than that of the non-selected mobile broadcast signal.

Preferably, the mobile communication terminal further includes a band pas filter (BPF) band-passing the GPS signal outputted from the second means.

Preferably, the first means diverges the CDMA or mobile broadcast signal according to an inputted mode selection control signal. And, the second means diverges the mobile broadcast or GPS signal according to an inputted mode selection control signal.

Preferably, the first means includes a diplexer. And, the second means comprises a diplexer.

Preferably, the mobile broadcast is a digital multimedia broadcasting (DMB).

In another aspect of the present invention, a method of signal reception in a mobile communication terminal includes the steps of diverging a CDMA or mobile broadcast signal from a signal received via a CDMA-mobile broadcast dual band antenna, diverging a mobile broadcast or GPS signal from a signal received via a mobile broadcast-GPS dual band antenna, comparing qualities of the mobile broadcast signals received by the two diverging steps, and selecting the mobile broadcast signal having the better quality of reception.

Preferably, the two diverging steps are carried out by a diplexer selectively establishing a reception path according to a mode selection control signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
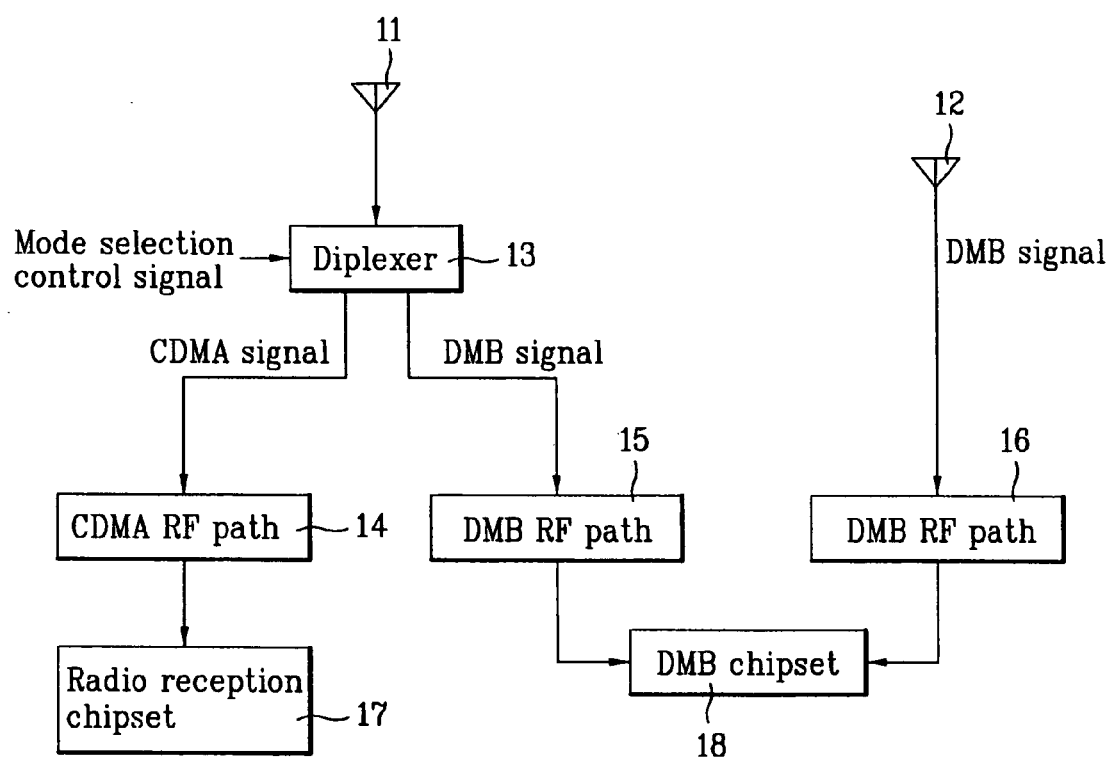
FIG. 1 is a block diagram of a mobile communication terminal according to a related art.
Figure 2:
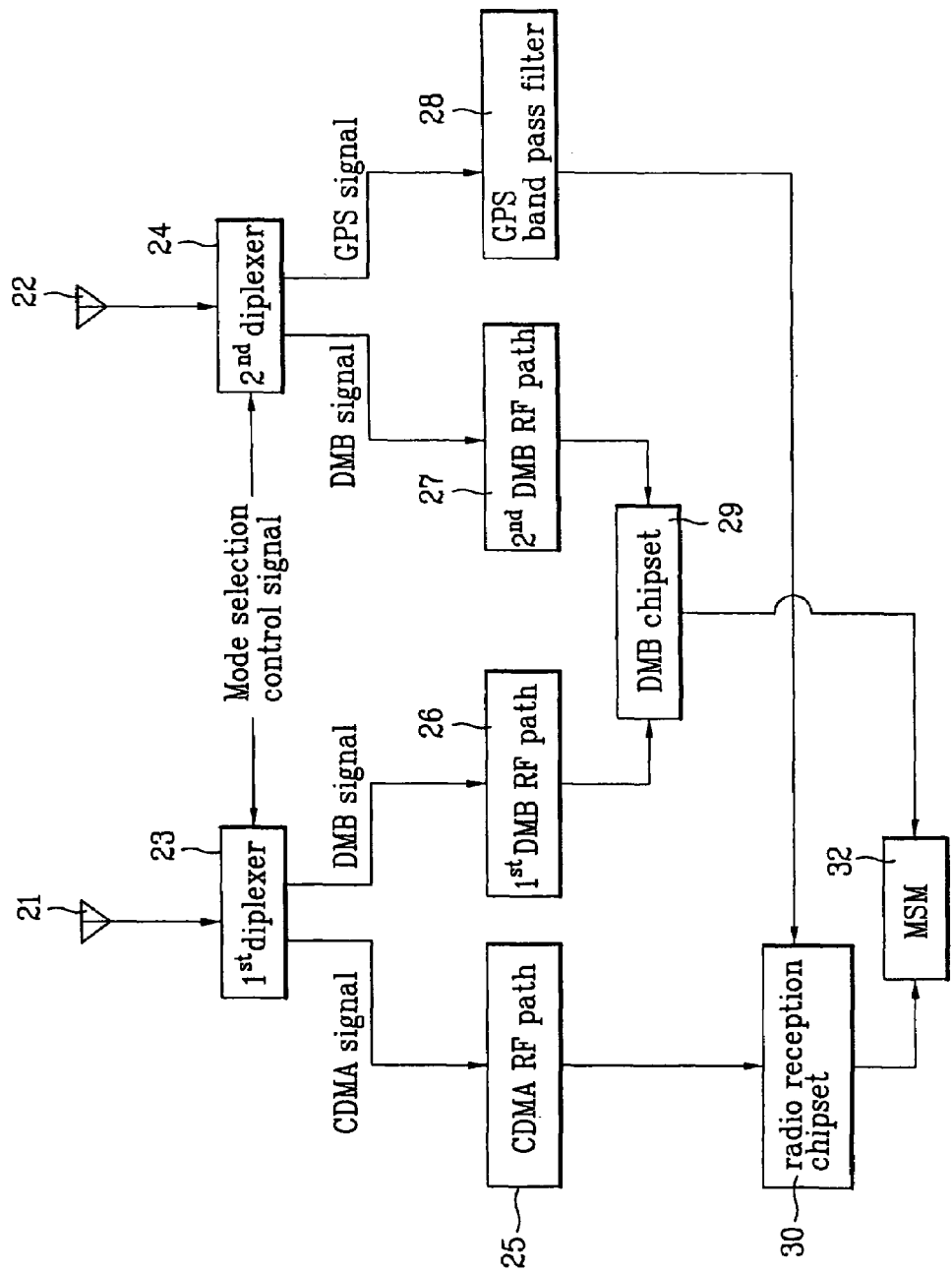
FIG. 2 is a block diagram of a mobile communication terminal according to one preferred embodiment of the present invention.

FIG. 2 is a block diagram of a mobile communication terminal according to one preferred embodiment of the present invention.

Referring to FIG. 2, a mobile communication terminal according to one preferred embodiment of the present invention includes a CDMA-DMB dual band antenna 21 receiving a CDMA or DMB signal, a DMB-GPS dual band antenna 22 receiving a DMB or GPS signal, a first diplexer 23 diverging the CDMA or DMB signal received by the CDMA-DMB dual band antenna 23, a second diplexer 24 diverging the DMB or GPS signal received by the DMB-GPS dual band antenna 22, a DMB chipset 29 selecting a signal having a better quality from the DMB signals respectively outputted from the first and second diplexers 23 and 24 to perform data processing on the selected signal, a radio reception chipset 30 converting the CDMA signal signal-processed via an RF path from the first diplexer 23 and the GPS signal signal-processed via an RF path from the second diplexer 24 to baseband signals, and a GPS band-pass filter 28 band-passing the GPS signal outputted from the second diplexer 24. In this case, the RFR chipset by Qualcomm can be used as the radio reception chipset 30.

A CDMA RF path 25 is a path for the CDMA signal outputted from the first diplexer 23 to be delivered to the radio reception chipset 30. A first DMB RF path 26 is a path for the DMB signal outputted from the first diplexer 23 to be delivered to the DMB chipset 29. A second DMB RF path 27 is a path for the DMB signal outputted from the second diplexer 24 to be delivered to the DMB chipset 29.

An MSM 32 is a processor chip that drives various functions and applications including a short message service support, various multimedia support, Internet function and the like as well as a basic function of voice communication.

And, the CDMA RF path 25, the first DMB RF path 26 and the second DMB RF path 27 can employ the related art.

An operation of one preferred embodiment of the present invention shown in FIG. 2 is explained as follows.

First of all, the signal received via the CDMA-DMB dual band antenna 21 is separated into the CDMA or DMB signal according to a mode selection control signal by the first diplexer 23. The CDMA signal outputted from the first diplexer 23 is signal-processed via the CDMA RF path 25 to be inputted to the radio reception chipset 30. And, the DMB signal outputted from the first diplexer 23 is signal-processed via the first DMB RF path 26 to be inputted to the DMB chipset 29.

The signal received via the DMB-GPS dual band antenna 22 is separated into the DMB or GPS signal according to a mode selection control signal by the second diplexer 24. The DMB signal outputted from the second diplexer 24 is signal-processed via the DMB RF path 27 to be inputted to the DMB chipset 29. And, the GPS signal outputted from the second diplexer 24 is band-passed by the GPS band-pass filter 28 to be inputted to the radio reception chipset 30.

The radio reception chipset 30 converts the inputted CDMA and GPS signals to baseband signals to deliver to the MSM 32. The RFR chipset can be used as the radio reception chipset 30. In this case, the RFR chipset mixes the CDMA or GPS signal as an RF signal with a local signal outputted from a voltage controlled oscillator (VCO) (not shown) built into the chip to convert to the baseband.

The DMB chipset 20 selects the signal having the better signal quality from the DMB signals respectively inputted via the first and second DMB RF paths 26 and 27, then converts the selected signal to a baseband signal, and then delivers the converted signal to the MSM 32.

The MSM 32 receives the CDMA, DMB and GPS signals respectively converted to the baseband signals and then performs data processing on the received signals. Hence, the data-processed signals can be used by the application program of the mobile communication terminal.

Accordingly, the present invention provides the following effects or advantages.

First of all, by avoiding the triple band antenna enabling the interference according to the frequency deviation between the CDMA, GPS and DMB bands, the present invention prevents the interference on the radio signals received via antenna.

Secondly, by configuring the antenna additionally provided for the DMB reception with the dual band antenna enabling the reception of the GPS signal and by adjusting each of the diplexers according to the mode selection control signal to select the signals received by both antennas, the present invention enables the interference-free radio signal reception, whereby the mobile communication terminal can enable the high-quality receptions of the DMB and GPS services.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal comprising:
    a first reception path establishing unit to receive a CDMA or mobile broadcast signal;
    a second reception path establishing unit to receive a mobile broadcast or GPS (global positioning system) signal;
    a mobile broadcast chipset receiving the mobile broadcast signal delivered via the first or second reception path establishing unit; and
    a radio frequency reception (RFR) chipset receiving the CDMA and/or GPS signal delivered via the first or second reception path establishing unit.

2. The mobile communication terminal of claim 1, wherein the first reception path establishing unit comprises a CDMA-mobile broadcast dual band antenna receiving the CDMA or mobile broadcast signal and a first diplexer selecting the CDMA or mobile broadcast signal received via the CDMA-mobile broadcast dual band antenna according to the mode selection control signal and wherein the second reception path establishing unit comprises a mobile broadcast-GPS dual band antenna receiving the mobile broadcast or GPS signal and a second diplexer selecting the mobile broadcast or GPS signal received via the mobile broadcast-GPS dual band antenna according to the mode selection control signal.

3. The mobile communication terminal of claim 2, further comprising a band-pass filter (BPF) passing the GPS signal selected by the second diplexer.

4. The mobile communication terminal of claim 1, wherein the mobile broadcast is a digital multimedia broadcasting (DMB).

5. A mobile communication terminal comprising:
    a CDMA-mobile broadcast dual band antenna receiving a CDMA or mobile broadcast signal;
    a mobile broadcast-GPS dual band antenna receiving a mobile broadcast of GPS signal;
    a first means for diverging the CDMA or mobile broadcast signal received by the CDMA-mobile broadcast dual band antenna;
    a second means for diverging the mobile broadcast or GPS signal received by the mobile broadcast-GPS dual band antenna; and
    a third means for selecting either the mobile broadcast signal outputted from the first means or the mobile broadcast signal outputted from the second means if the selected mobile broadcast signal has a signal quality better than that of the non-selected mobile broadcast signal.

6. The mobile communication terminal of claim 5, further comprising a band-pass filter (BPF) band-passing the GPS signal outputted from the second means.

7. The mobile communication terminal of claim 5, wherein the first means diverges the CDMA or mobile broadcast signal according to an inputted mode selection control signal.

8. The mobile communication terminal of claim 5, wherein the second means diverges the mobile broadcast or GPS signal according to an inputted mode selection control signal.

9. The mobile communication terminal of claim 5, wherein the first means comprises a diplexer.

10. The mobile communication terminal of claim 5, wherein the second means comprises a diplexer.

11. The mobile communication terminal of claim 5, wherein the mobile broadcast is a digital multimedia broadcasting (DMB).

12. A method of signal reception in a mobile communication terminal, comprising the steps of:
    diverging a CDMA or mobile broadcast signal from a signal received via a CDMA-mobile broadcast dual band antenna;
    diverging a mobile broadcast or GPS signal from a signal received via a mobile broadcast-GPS dual band antenna;
    comparing qualities of the mobile broadcast signals received by the two diverging steps; and
    selecting the mobile broadcast signal having the better quality of reception.

13. The method of claim 12, wherein the two diverging steps are carried out by a diplexer selectively establishing a reception path according to a mode selection control signal.

14. The method of claim 12, wherein the mobile broadcast is a digital multimedia broadcasting (DMB).

* * * * *